(12) United States Patent
Ooba

(10) Patent No.: US 10,442,633 B2
(45) Date of Patent: Oct. 15, 2019

(54) ROBOT SYSTEM

(71) Applicant: FANUC CORPORATION, Yamanashi (JP)

(72) Inventor: Masafumi Ooba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/033,628

(22) Filed: Jul. 12, 2018

(65) Prior Publication Data

US 2019/0047141 A1    Feb. 14, 2019

(30) Foreign Application Priority Data

Aug. 9, 2017    (JP) .................... 2017-154042

(51) Int. Cl.
*B65G 47/08*    (2006.01)
*B65G 43/08*    (2006.01)
(Continued)

(52) U.S. Cl.
CPC ............. *B65G 47/08* (2013.01); *B07C 1/04* (2013.01); *B25J 9/0093* (2013.01); *B25J 9/1697* (2013.01);
(Continued)

(58) Field of Classification Search
CPC ........ B65G 47/08; B65G 43/08; B65G 47/68; B65G 47/681; G05B 19/41815
See application file for complete search history.

(56) References Cited

U.S. PATENT DOCUMENTS 5,082,103 A * 1/1992 Ross ................. B65G 47/31
198/460.1
5,168,163 A * 12/1992 Francioni ............. B65B 57/10
209/524

(Continued)

FOREIGN PATENT DOCUMENTS

EP    1228986 A1    8/2002
EP    1522911 A2    4/2005
(Continued)

OTHER PUBLICATIONS

JP Decision to Grant a Patent dated Jul. 2, 2019, in connection with corresponding JP Application No. 2017-154042 (5 pgs., including English translation).
(Continued)

*Primary Examiner* — Thomas Randazzo
(74) *Attorney, Agent, or Firm* — Maier & Maier, PLLC

(57) ABSTRACT

A robot system including a conveying device; a robot that processes an object being conveyed; a first and second supply unit that supply the object onto the conveying device; a movement amount detection unit that successively detects an amount of movement of the object supplied by the first supply unit; a single vision sensor that successively acquires visual information of the object being conveyed; an object detection unit that processes the acquired visual information to detect position and orientation of the object; an interval detection unit that detects an interval between objects on the conveying device; a control unit that controls the robot based on the amount of movement and the position and orientation; and a production management unit that causes the second supply unit to supply the object at a position of the interval.

4 Claims, 8 Drawing Sheets

TIME POINT t1: IMAGE-CAPTURING
→DETECTION OF ABSENCE OF OBJECT IN OBJECT PRESENCE CHECK REGION
→GENERATION OF SUPPLY COMMAND SIGNAL

TIME POINT t1+tL: SUPPLY OF OBJECT BY HOPPER

(51) Int. Cl.
*B07C 1/04* (2006.01)
*B25J 9/16* (2006.01)
*B25J 9/00* (2006.01)
*B65B 57/10* (2006.01)
*G05B 19/418* (2006.01)

(52) U.S. Cl.
CPC .............. *B65B 57/10* (2013.01); *B65G 43/08* (2013.01); *G05B 19/4182* (2013.01); *G05B 19/41815* (2013.01); *G05B 2219/39106* (2013.01)

(56) References Cited

U.S. PATENT DOCUMENTS

| | | | |
|---|---|---|---|
| 7,199,385 B2 * | 4/2007 | Wehrle | G01B 11/04 250/559.19 |
| 2002/0112938 A1 * | 8/2002 | Shiohara | B65G 47/681 198/357 |
| 2005/0075752 A1 | 4/2005 | Ban et al. | |
| 2005/0199470 A1 | 9/2005 | Buchi | |
| 2009/0032370 A1 * | 2/2009 | Konig | B65G 43/10 198/460.1 |
| 2010/0028121 A1 * | 2/2010 | Lalesse | B65G 1/06 414/802 |
| 2010/0051513 A1 * | 3/2010 | Skyum | A22C 17/008 209/10 |
| 2012/0236140 A1 * | 9/2012 | Hazeyama | B25J 9/1697 348/94 |
| 2014/0137510 A1 | 5/2014 | Lang | |
| 2015/0251860 A1 * | 9/2015 | Kimura | B65G 37/00 198/456 |
| 2016/0001983 A1 * | 1/2016 | Ooba | B65G 37/00 414/787 |
| 2016/0151916 A1 | 6/2016 | Kanno et al. | |
| 2018/0001469 A1 | 1/2018 | Ooba | |
| 2018/0333749 A1 * | 11/2018 | Wagner | B07C 1/04 |

FOREIGN PATENT DOCUMENTS

| | | |
|---|---|---|
| JP | S51-136275 U | 11/1976 |
| JP | H07-116944 A | 5/1995 |
| JP | H07-215665 A | 8/1995 |
| JP | H08-091550 A | 4/1996 |
| JP | H10-139147 A | 5/1998 |
| JP | H11-19891 A | 1/1999 |
| JP | 2002-226031 A | 8/2002 |
| JP | 2005-111607 A | 4/2005 |
| JP | 2012-188231 A | 10/2012 |
| JP | 2016-107349 A | 6/2016 |
| JP | 2018-001312 A | 1/2018 |

OTHER PUBLICATIONS

JP Search Report dated Jun. 20, 2019, in connection with corresponding JP Application No. 2017-154042 (13 pgs., including English translation).

* cited by examiner

ROBOT SYSTEM

CROSS-REFERENCE TO RELATED APPLICATIONS

This application claims the benefit of Japanese Patent Application No. 2017-154042, the content of which is incorporated herein by reference.

FIELD

The present invention relates to a robot system.

BACKGROUND

Conventionally, there is known a robot system for picking up, from a conveyor, an object being conveyed by the conveyor, by detecting position and orientation of the object and tracking the object by a robot (for example, see PTL 1).

The robot system in PTL 1 includes a temporary placing table where an object picked up from the conveyor is temporarily stored in a case where there is an excessive supply of objects by the conveyor, and an object stored on the temporary placing table is picked up to be used when supply of objects by the conveyor becomes insufficient.
PTL 1
Japanese Unexamined Patent Application, Publication No. 2012-188231

SUMMARY

An aspect of the present invention provides a robot system including a conveying device that conveys an object in one direction; a robot, installed near the conveying device, that performs a process on the object being conveyed by the conveying device; a first supply unit and a second supply unit that supply the object onto the conveying device; a movement amount detection unit that successively detects an amount of movement, by the conveying device, of the object supplied by the first supply unit onto the conveying device; a single vision sensor that successively acquires, on an upstream side of the robot in a conveying direction, visual information of the object being conveyed by the conveying device; an object detection unit that processes the visual information acquired by the vision sensor to detect position and orientation of the object; an interval detection unit that processes the visual information acquired by the vision sensor to detect an interval between objects on the conveying device in the conveying direction; a control unit that controls the robot based on the amount of movement of the object detected by the movement amount detection unit and the position and orientation of the object detected by the object detection unit; and a production management unit that causes the second supply unit to supply the object at a position of the interval detected by the interval detection unit, in a case where the interval is greater than a predetermined threshold.

DETAILED DESCRIPTION

Hereinafter, a robot system 1 according to an embodiment of the present invention will be described with reference to the drawings.

Figure 1:
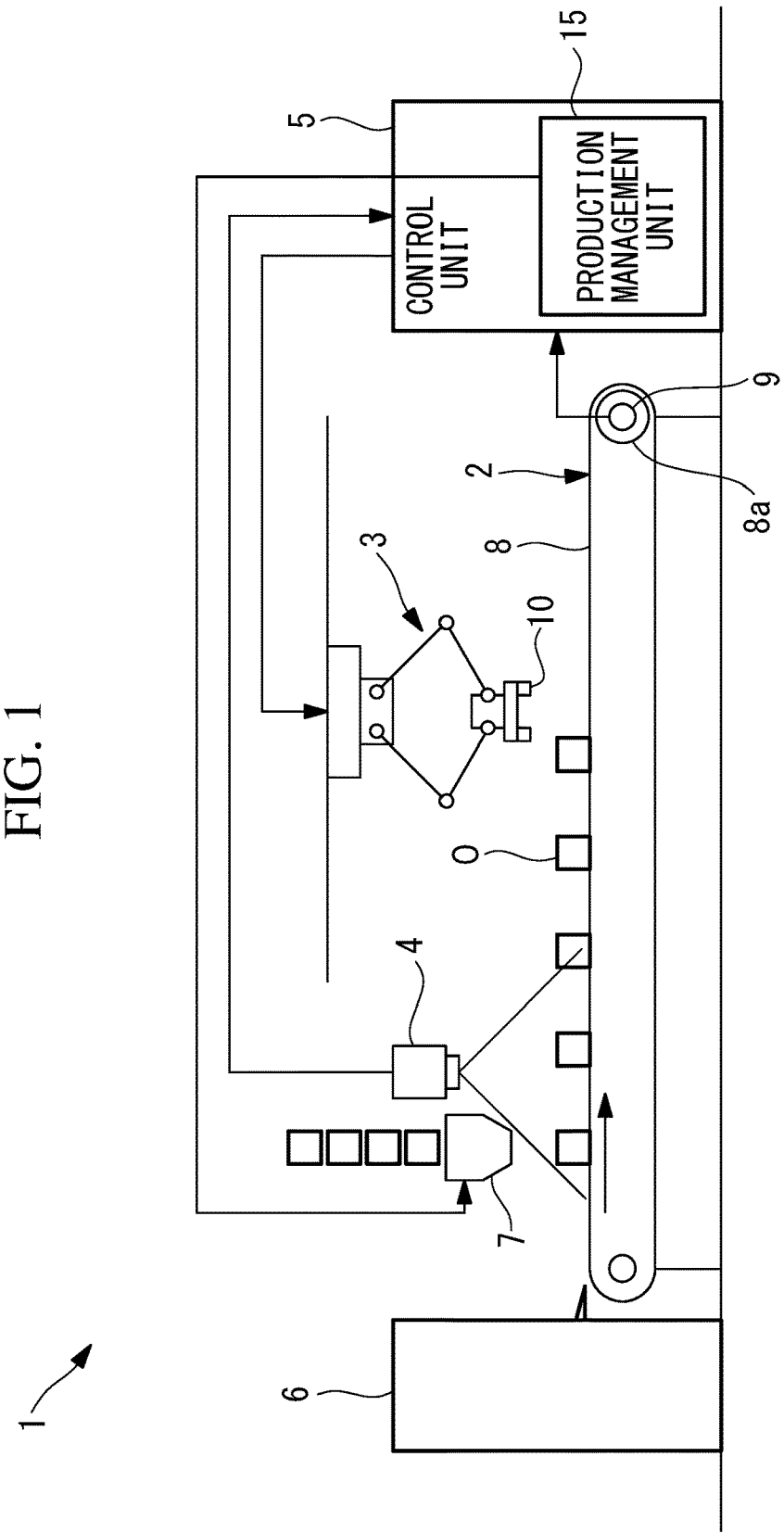
FIG. 1 is an overall configuration diagram showing a robot system according to an embodiment of the present invention.

As shown in FIG. 1, the robot system 1 according to the present embodiment includes a conveyor (conveying device) 2 that conveys objects O, a first supply unit 6 that supplies the objects O onto the conveyor 2 at an upstream side of the conveyor 2, a robot 3 installed near the conveyor 2, a camera (vision sensor) 4 installed facing downward above the conveyor 2, on the upstream side of the robot 3 in a conveying direction, a control unit 5 that controls the robot 3 based on an image (visual information) acquired by the camera 4, and a second supply unit 7 that supplies the objects O into a field of view of the camera 4.

For example, the conveyor 2 is a belt conveyor, and includes a belt 8 that convey, in one direction, the objects O which are placed on the belt 8. The belt 8 is driven by a motor 8a. The motor 8a is provided with an encoder (movement amount detection unit) 9 that detects a rotation angle of the motor 8a, and indirectly detects the amount of movement of the object O by the belt 8 based on a reduction ratio of a drive force transmission mechanism (not shown) from the motor 8a to the belt 8. Furthermore, the encoder 9 does not necessarily have to be provided at the motor 8a, and a rotary disc may be attached to a rotation shaft of the encoder 9 and the rotary disc may be pressed against the belt 8.

The robot 3 may be of any type such as a horizontal mounting type or a ceiling mounting type, and a robot hand 10 which is capable of gripping the object O is provided at a distal end of a wrist of the robot 3, for example.

The camera 4 has a field of view (see FIG. 3) A which is fixed at a partial region of the conveyor 2 in the conveying direction, and acquires a two-dimensional image of the object O being conveyed on the conveyor 2. A frame rate of the camera 4 is set in advance in such a way that image-capturing is performed at least twice while the same object O is passing through the field of view A.

Figure 2:
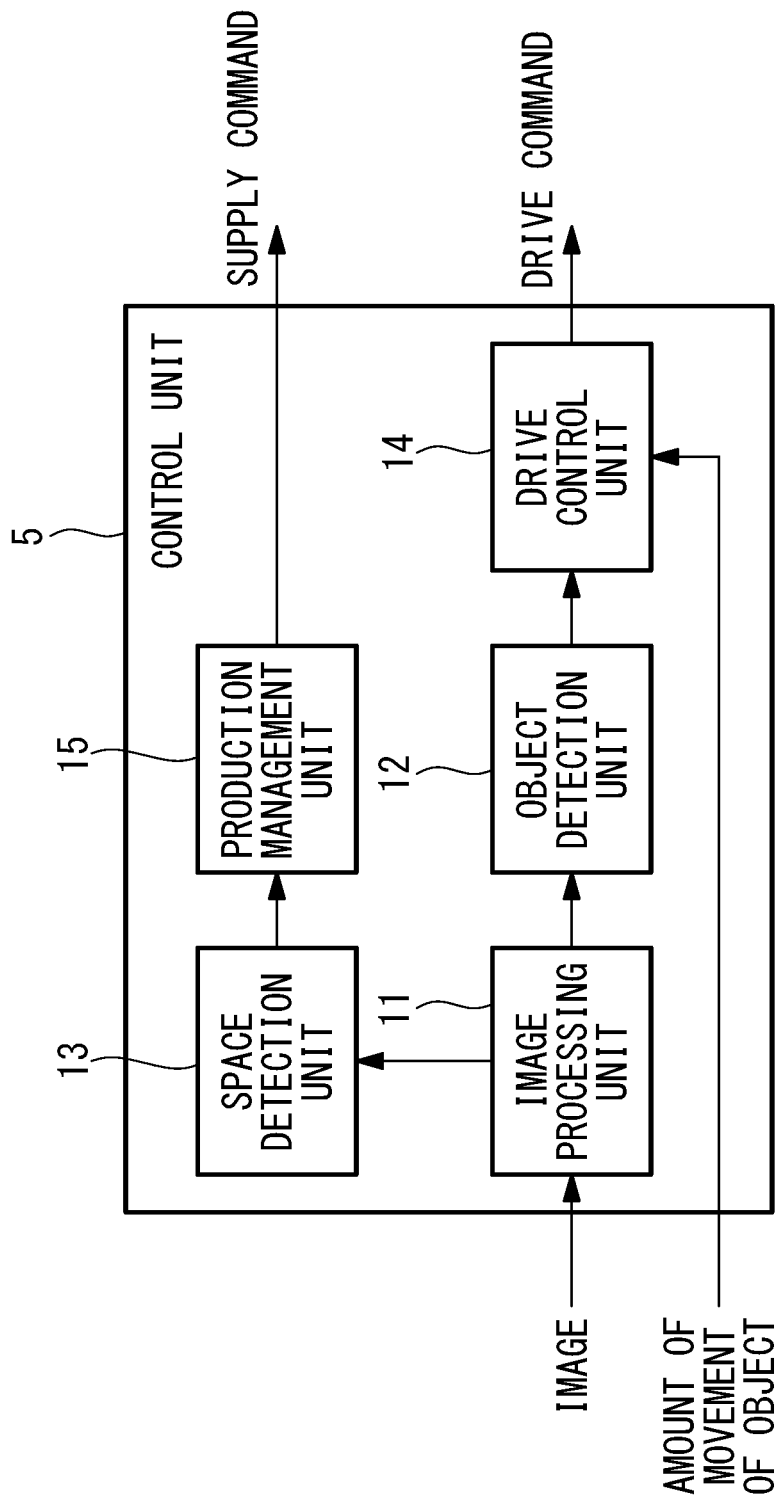
FIG. 2 is a block diagram showing a control unit provided in the robot system in FIG. 1.

As shown in FIG. 2, the control unit 5 includes an image processing unit 11 that processes an image acquired by the camera 4 to recognize the object O being conveyed by the conveyor 2, an object detection unit 12 that detects position and orientation of the object O recognized by the image processing unit 11, a space detection unit (interval detection unit) 13 that detects an empty space (interval) between the recognized objects O, a drive control unit (control unit) 14 that controls the robot 3 based on the position and orientation of the object O detected by the object detection unit 12 and the amount of movement of the object O detected by the encoder 9, and a production management unit 15 that causes the object O to be supplied by the second supply unit 7, in a case where the space detected by the space detection unit 13 is greater than a predetermined size (threshold). The control unit 5 is configured by hardware such as the CPU, memory and the like, which are not shown.

The drive control unit 14 causes the robot 3 to operate according to an operation program which is taught in advance, and also, performs tracking of following the object O on the conveyor 2 based on the amount of movement of the object O detected by the encoder 9, and causes the robot hand 10 attached to the distal end of the wrist to perform a process of gripping the moving object O and picking up the object O from the conveyor 2.

More specifically, the image processing unit 11 is to recognize an object O in an acquired image by a technique such as pattern matching, for example. Furthermore, the object detection unit 12 detects presence/absence of the object O in the image of the object O recognized by the image processing unit 11, and in the case of presence of the object O, the object detection unit 12 detects two-dimensional coordinates (position) and a rotation angle (orientation) around a vertical axis of the object O.

Figure 3:
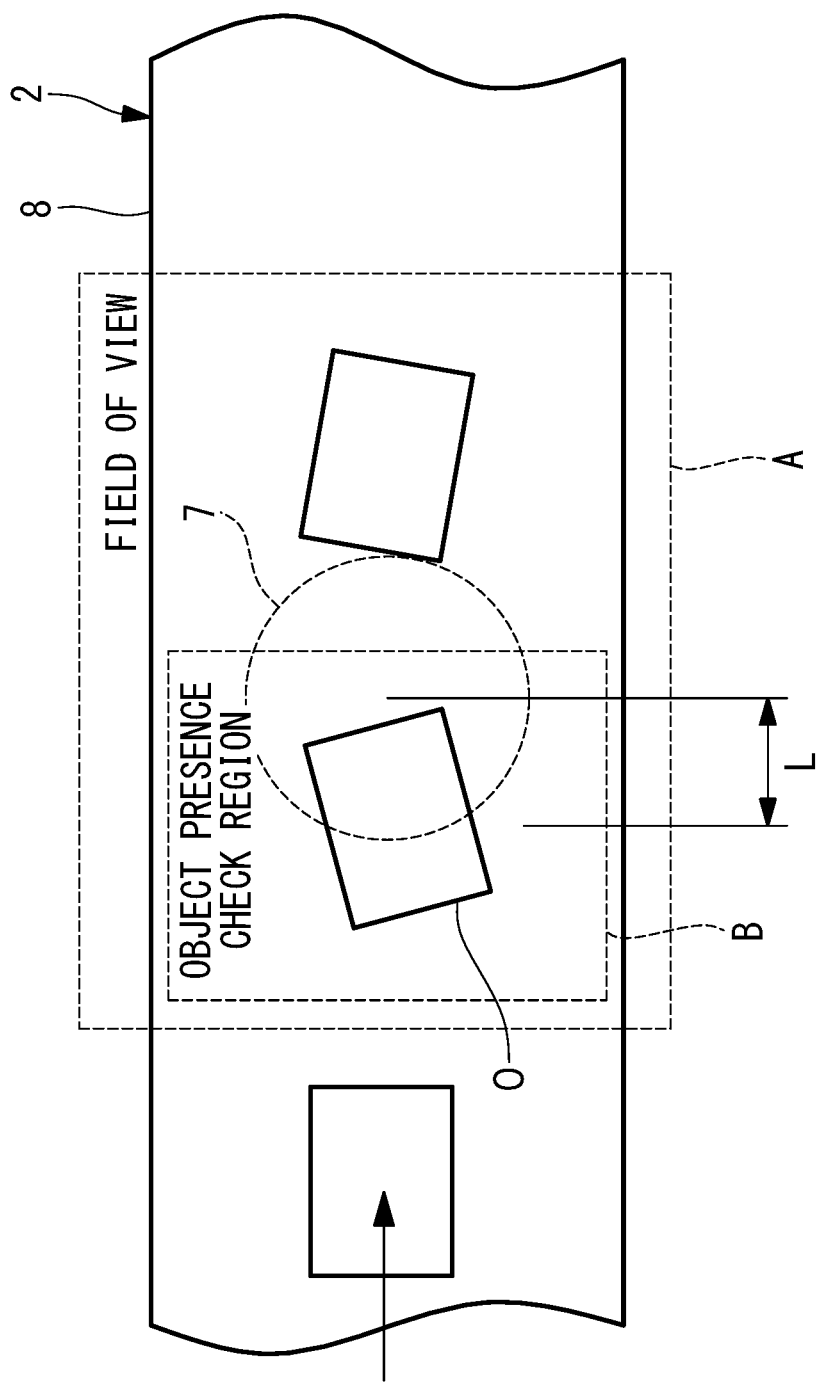
FIG. 3 is a plan view showing, with respect to the robot system in FIG. 1, a relationship among a conveyor, a field of view of a camera, and an object presence check region.

Furthermore, as shown in FIG. 3, the space detection unit 13 sets a certain object presence check region B in the field of view A of the camera 4, and detects whether or not an object O is present in the object presence check region B. Moreover, in the case where an object O is not present in the object presence check region B, the space detection unit 13 determines that there is enough empty space for putting in an object O, and outputs a signal to the effect to the production management unit 15.

The object presence check region B set in the field of view A of the camera 4 is arranged on the upstream side with a space allowing acquisition of an image of an object O by the camera 4, from a downstream end of the field of view A of the camera 4. In the present embodiment, the field of view A of the camera 4 is equally divided into an upstream side and a downstream side in the conveying direction of the conveyor 2, and the object presence check region B is set on the upstream side.

For example, the first supply unit 6 is a transfer device that transfers, at predetermined intervals, objects O conveyed from another conveyor, not shown, to the conveyor 2 of the robot system 1 according to the present embodiment. For example, the objects O are conveyed at random intervals by the other conveyor. Conveying velocity of the objects O by the conveyor 2 of the robot system 1 according to the present embodiment is maintained constant at all times, and thus, when the objects O are conveyed by the other conveyor in a closely packed manner, the other conveyor is decelerated, for example, to allow transfer to the conveyor 2 of the robot system 1 according to the present embodiment to be performed at equal intervals. On the other hand, if the objects O are conveyed by the other conveyor in a sparse manner, transfer is performed in a thinned manner, and intervals between the objects O on the conveyor 2 are increased.

The second supply unit 7 is a hopper which contains a large number of objects O, and which is capable of supplying the objects O one by one according to a supply command signal from the production management unit 15.

As shown in FIG. 3, the second supply unit 7 is arranged to supply objects O on the downstream side, in the conveying direction, of a center position of the object presence check region B by a predetermined distance L. The predetermined distance L is set to a value which is obtained by multiplying together time required for the object O to be supplied onto the conveyor 2 after a command signal from the production management unit 15 is received and standard velocity of the conveyor 2.

An operation of the robot system 1 according to the present embodiment configured in the above manner will be described below.

With the robot system 1 according to the present embodiment, when an object O is supplied by the first supply unit 6 onto the conveyor 2, the supplied object O is conveyed in one direction by the conveyor 2, and an image of the object O is captured by the camera 4 while the object O is passing through the range of the field of view A of the camera 4. An image acquired by the image-capturing is sent to the image processing unit 11 to be subjected to image processing, and the object O is thereby recognized.

Then, information about the recognized object O is sent to the object detection unit 12 and the space detection unit 13, and the position and orientation of the object O are detected by the object detection unit 12, and also, whether or not at least a predetermined interval is present between the objects O is detected by the space detection unit 13. For example, if no object O is detected, the interval between the objects O is equivalent to at least a width of the object presence check region B in a flow direction of the conveyor 2, and it is determined that at least a predetermined interval is present.

Figure 4:
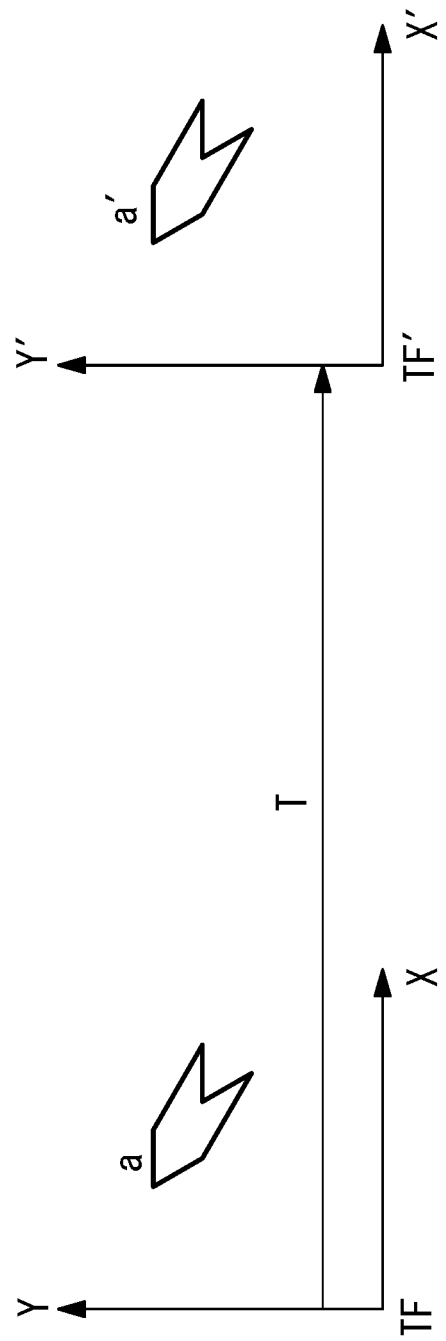
FIG. 4 is a diagram describing tracking coordinate transformation according to the robot system in FIG. 1.

As shown in FIG. 4, the drive control unit 14 sets a tracking coordinate system TF based on the position and orientation of the object O detected by the object detection unit 12, and calculates the amount of movement of the object O by $$(e2-e1)/\text{Scale},$$

where $e1$, $e2$ are encoder counts detected by the encoder 9 at an image-capturing time point and a current time point, respectively, and Scale is a constant indicating a relationship between the encoder counts $e1$, $e2$ and the amount of movement of the conveyor 2. Then, a current tracking coordinate system TF' is calculated by multiplying a coordinate transformation matrix T which takes the amount of movement as a component by the tracking coordinate system TF.

$$TF' = T \cdot TF$$

Furthermore, in FIG. 4, a reference sign a indicates the position and orientation of the object O seen from the coordinate system TF at the image-capturing time point, and a reference sign a' indicates the position and orientation of the object O currently seen from the coordinate system TF'. Reference signs X, Y, X', Y' indicate coordinate axes of the coordinate systems TF, TF'.

The drive control unit 14 can move the robot hand 10 to follow the object O being conveyed by the conveyor 2, with reference to the calculated tracking coordinate system TF', and can grip and pick up the object O from the conveyor 2.

Figure 5:
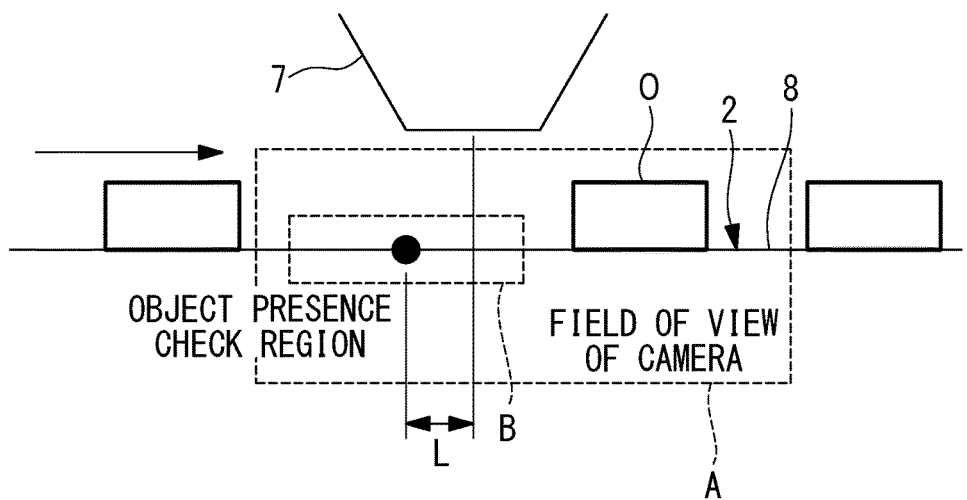
FIG. 5 is a partial side view showing an example of when absence of an object in the object presence check region is detected by the robot system in FIG. 1.

As shown in FIG. 5, with the robot system 1 according to the present embodiment, in the case where absence of the object O in the object presence check region B set in the field of view A of the camera 4 is detected by the object detection unit 12 by processing an image acquired by the camera 4 at a certain time point, a supply command is output from the production management unit 15. The second supply unit 7 is caused to operate by the supply command, and the object O is supplied by the second supply unit 7 onto the conveyor 2.

In the drawing, a black circle indicates the position of the conveyor 2 corresponding to the center position of the object presence check region B at the time of image-capturing.

That is, in the case where there is no object O in the object presence check region B, an empty space of at least the range of the object presence check region B is present, and thus, by supplying the object O in the empty space, an advantage that reduction in productivity of the robot 3 may be prevented by solving deficiency in the supply of objects O can be achieved.

Figure 6:
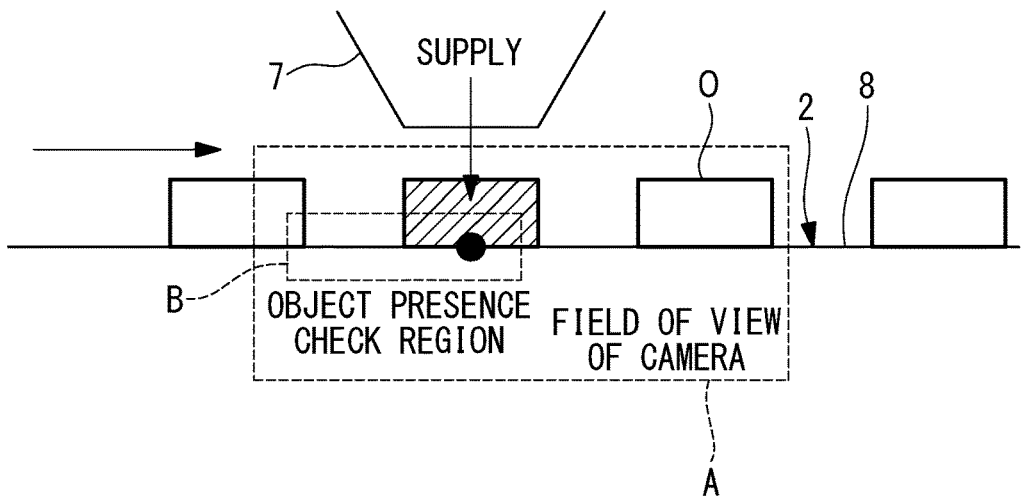
FIG. 6 is a partial side view showing an example of when an object is supplied from a second supply unit after the detection in FIG. 5.

In this case, as shown in FIG. 6, because the hopper configuring the second supply unit 7 is arranged on the downstream side of the center of the object presence check region B by the predetermined distance L, even if the conveyor 2 moves by a distance L corresponding to a time lag tL from output of the supply command from the production management unit 15 at the time point when absence of the object O is confirmed to supply of the object O, the object (shaded object) O can be accurately supplied at the position of the empty space, or at the position of the black circle, which is arranged at the center of the object presence check region B at the time of image-capturing, and an advantage that a gap to the preceding object O or the following object O is not made too small can be achieved.

Figure 7:
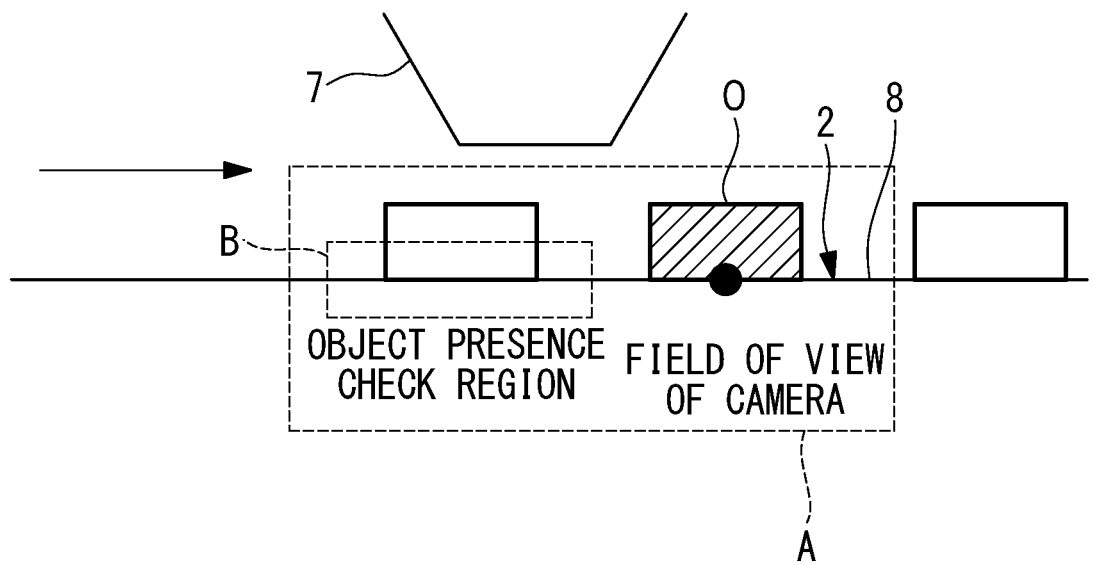
FIG. 7 is a partial side view showing an example of when an image of the object supplied in FIG. 6 is captured.

Furthermore, in the present embodiment, because the field of view A of the camera 4 is equally divided into two in the conveying direction, and the object presence check region B is arranged in the region on the upstream side, an object O which is supplied by the second supply unit 7 due to detection of absence of an object O in the object presence check region B at first image-capturing is then captured by second image-capturing at the time of passing through the region on the downstream side of the field of view A, as shown in FIG. 7, and thus, the position and orientation of the object O can be detected.

That is, with the robot system 1 according to the present embodiment, presence/absence of an empty space on the conveyor 2 is detected by using an image which is acquired by the camera 4 by capturing an object O being conveyed by the conveyor 2 to detect the position and orientation of the object O, and an object O is supplied in the empty space, and thus, there are advantages that a new vision sensor does not have to be added, that a temporary placing table is not necessary and the robot 3 does not have to be unnecessarily moved, and also, that deficiency in supply of objects O by the first supply unit 6 can be supplemented and productivity can be increased.

Furthermore, there is an advantage that the robot 3 does not have to determine movement of an object O to a temporary placing table or picking up of an object O from the temporary placing table, and the operation program is thus not complicated.

Figure 8:
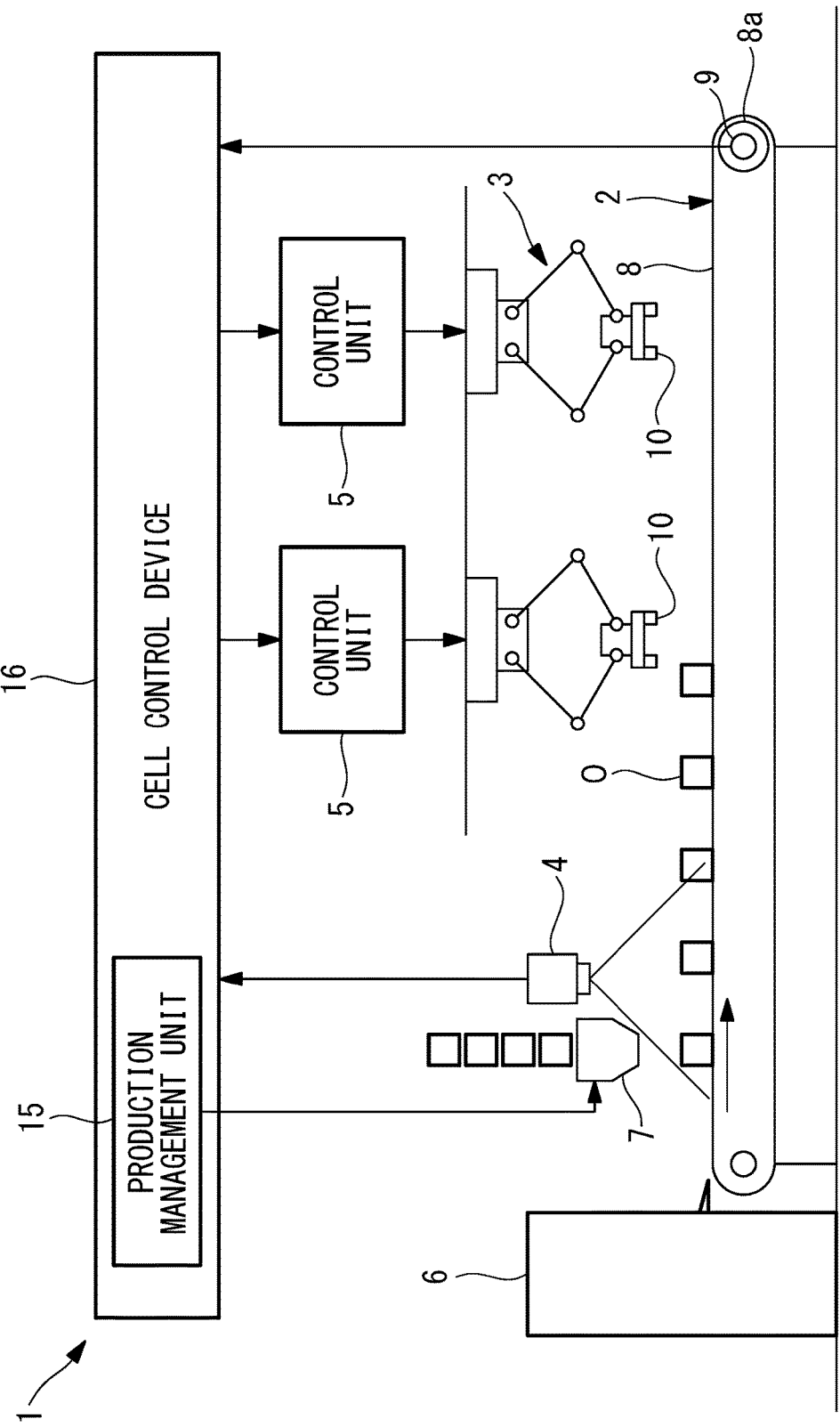
FIG. 8 is an overall configuration diagram showing a modification of the robot system in FIG. 1.

Additionally, the present embodiment describes the robot system 1 provided with a single robot 3 and a single control unit 5, but instead, as shown in FIG. 8, a plurality of robots 3 may be arranged along the conveying direction of the conveyor 2, and respective control units 5 may be connected to an upper-level cell control device 16.

In the case where a plurality of robots 3 are to perform tasks on objects O conveyed by the same conveyor 2, the positions and orientations of objects O calculated based on an image captured by one camera 4 may be used for processing by all the robots 3, and objects O may be supplied according to spaces between objects O.

In this case, even if power of one of the robots 3 is switched off for maintenance or the like, a production management unit 15 provided in the cell control device 16 may output a supply command to the second supply unit 7 so that the quantity of objects O conveyed by the conveyor 2 is appropriately adjusted in accordance with the processing amount of the rest of the robots 3.

Furthermore, in the present embodiment, the amount of movement of the object O by the conveyor 2 is detected by using the encoder 9, but instead, the amount of movement of the object O may be detected by using an image which is acquired by the camera 4 that detects the position and orientation of the object O and that detects spaces between objects O.

Figure 9:
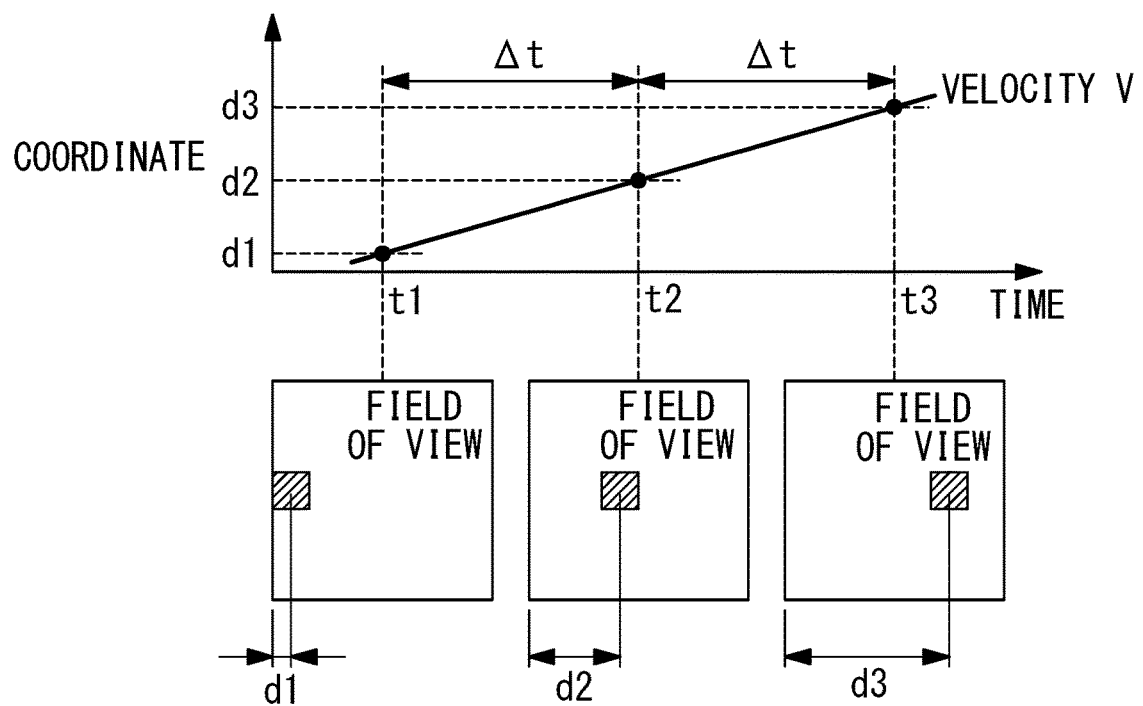
FIG. 9 is a diagram showing another modification of the robot system in FIG. 1, describing a case of detecting velocity of movement of an object by a conveyor from acquired images.

In this case, as shown in FIG. 9, objects O in a plurality of images of the same field of view acquired at different time points t1, t2, t3 at a predetermined time interval $\Delta t$ are recognized, and coordinate positions d1, d2, d3 of centers of gravity of the recognized objects O are calculated.

Then, objects O, the centers of gravity of which are near a same coordinate in a direction orthogonal to the conveying direction in images acquired adjacently in a time axis direction, may be recognized to be the same object O, and conveying velocity V may be calculated by dividing each of differences d3−d2, d2−d1 in coordinate values of the centers of gravity of the object O in the conveying direction by the time interval $\Delta t$ of image-capturing. In the case where the conveying velocity V is calculated several times for the same object O, an average value or a value obtained by performing fitting by least squares method or the like may be output as the conveying velocity.

Moreover, in this case, a frame rate of images for checking presence/absence of an object O in the object presence check region B and for checking the position/orientation of the object O may be set low, and a frame rate of images for detecting the conveying velocity V of an object O by the conveyor 2 may be set high. By detecting the conveying velocity V of an object O from images acquired at a high frame rate, the detection accuracy may be increased.

Moreover, in the present embodiment, the frame rate of the camera 4 is set in advance, but instead, the frame rate may be changed according to the amount of movement of the object O detected by the encoder 9.

From the above-described embodiment, the following invention is derived.

An aspect of the present invention provides a robot system including a conveying device that conveys an object in one direction; a robot, installed near the conveying device, that performs a process on the object being conveyed by the conveying device; a first supply unit and a second supply unit that supply the object onto the conveying device; a movement amount detection unit that successively detects an amount of movement, by the conveying device, of the object supplied by the first supply unit onto the conveying device; a single vision sensor that successively acquires, on an upstream side of the robot in a conveying direction, visual information of the object being conveyed by the conveying device; an object detection unit that processes the visual information acquired by the vision sensor to detect position and orientation of the object; an interval detection unit that processes the visual information acquired by the vision sensor to detect an interval between objects on the conveying device in the conveying direction; a control unit that controls the robot based on the amount of movement of the object detected by the movement amount detection unit and the position and orientation of the object detected by the object detection unit; and a production management unit that causes the second supply unit to supply the object at a position of the interval detected by the interval detection unit, in a case where the interval is greater than a predetermined threshold.

According to the present aspect, while objects, which are successively supplied by the first supply unit, are being conveyed by the conveying device, the amount of movement, by the conveying device, of an object is successively detected by the movement amount detection unit, and also, visual information is acquired by the vision sensor. When the acquired visual information is processed by the object detection unit, the position and orientation of the object are detected, and also, when the acquired visual information is processed by the interval detection unit, an interval between objects in the conveying direction is detected.

The robot is controlled by the control unit based on the amount of movement and the position and orientation, and an object being conveyed by the conveying device is processed.

In this case, if the interval between objects detected by the interval detection unit is greater than a predetermined threshold, the production management unit causes the second supply unit to operate such that an object is supplied at the position of the detected interval between objects. Accordingly, reduction in productivity due to deficiency in supply of objects may be prevented, without placing, on the robot, a burden of picking up an object from a temporary placing table and while preventing an operation program from becoming complicated such that the robot can be made to determine whether or not to pick up an object from the temporary placing table.

In the aspect described above, the interval detection unit may output, to the production management unit, a signal to an effect that the interval that is greater than the threshold is detected, in a case where the object is not detected in a predetermined object presence check region arranged in a field of view of the vision sensor, and the production management unit may, upon reception of the signal, cause the second supply unit to supply the object in the object presence check region.

An interval greater than the predetermined threshold may thus be easily detected, and the production management unit may easily solve deficiency in the supply of objects by causing the second supply unit to supply an object at the interval position.

Furthermore, in the aspect described above, the vision sensor may acquire the visual information at a frame rate of detecting the same object at least twice in the field of view, and the object presence check region may be arranged at a position on an upstream side away from a downstream end of the field of view at least by a distance allowing acquisition of the visual information by the vision sensor.

This allows the visual information to be acquired at least twice while the same object supplied by the first supply unit is being conveyed in one direction by the conveying device and is passing through the field of view of the vision sensor. Because an object which is supplied by the second supply unit in the object presence check region when there is no object in the object presence check region at the time of first acquisition of the visual information is moved to a downstream side by the conveying device, second acquisition of the visual information is performed between a downstream end of the object presence check region and the downstream end of the field of view, and the position and orientation may be detected.

Moreover, in the aspect described above, the second supply unit may be arranged on a downstream side from a center of the object presence check region by the amount of movement from reception of a command from the production management unit to supply of the object onto the conveying device.

Accordingly, in the case where absence of an object in the object presence check region is detected due to acquisition of the visual information by the vision sensor, and a command is output by the production management unit to cause the second supply unit to supply an object, even if there is a time lag until an object is actually supplied onto the conveying device, and even if an interval of only about the width of the object presence check region is present between objects, an object may be more reliably supplied at a center position of the interval between objects, because the second supply unit is arranged taking into account the time lag.

The invention claimed is:

1. A robot system comprising:
a conveying device that conveys an object in one direction;
a robot, installed near the conveying device, that performs a process on the object being conveyed by the conveying device;
a first supply unit and a second supply unit that supply the object onto the conveying device;
a movement amount detection unit that successively detects an amount of movement, by the conveying device, of the object supplied by the first supply unit onto the conveying device;
a single vision sensor that successively acquires, on an upstream side of the robot in a conveying direction, visual information of the object being conveyed by the conveying device;
an object detection unit that processes the visual information acquired by the vision sensor to detect position and orientation of the object;
an interval detection unit that processes the visual information acquired by the vision sensor to detect an interval between objects on the conveying device in the conveying direction;
a control unit that controls the robot based on the amount of movement of the object detected by the movement amount detection unit and the position and orientation of the object detected by the object detection unit; and
a production management unit that causes the second supply unit to supply the object at a position of the interval detected by the interval detection unit, in a case where the interval is greater than a predetermined threshold.

2. The robot system according to claim 1, wherein
the interval detection unit outputs, to the production management unit, a signal to an effect that the interval that is greater than the threshold is detected, in a case where the object is not detected in a predetermined object presence check region arranged in a field of view of the vision sensor, and
the production management unit, upon reception of the signal, causes the second supply unit to supply the object in the object presence check region.

3. The robot system according to claim 2, wherein
the vision sensor acquires the visual information at a frame rate of detecting the same object at least twice in the field of view, and
the object presence check region is arranged at a position on an upstream side away from a downstream end of the field of view at least by a distance allowing acquisition of the visual information by the vision sensor.

4. The robot system according to claim 2, wherein the second supply unit is arranged on a downstream side from a center of the object presence check region by the amount of movement from reception of a command from the production management unit to supply of the object onto the conveying device.

\* \* \* \* \*